ns Patent Office 3,298,989
Patented Jan. 17, 1967

3,298,989
POLYCHLOROPRENE ADHESIVE CONTAINING ZINC HALIDE
Clarence D. Moore, Manor Township, Lancaster County, Pa., assignor to Armstrong Cork Company, Lancaster, Pa., a corporation of Pennsylvania
No Drawing. Filed Jan. 6, 1964, Ser. No. 336,030
8 Claims. (Cl. 260—29.7)

This invention relates generally to adhesives, and more particularly to neoprene adhesives wherein the rubber is dissolved in a solvent therefor. Still more particularly, the invention relates to a solvent-type neoprene adhesive composition containing a zinc halide and which is stable over extended periods of time.

Solvent-type neoprene adhesives have long been made by preparing blends of neoprene, modifying resins, fillers, and other ingredients all dissolved and dispersed in a solvent system. The modifying resins were normally used to strengthen the adhesive. In particular, an oil-soluble, heat-advancing phenol-formaldehyde resin has been used in the past to impart heat strength to neoprene adhesives. Such adhesives require a filler, preferably magnesium oxide, to serve as an acid acceptor in the event of incipient breakdown of the neoprene, and also to serve as a reactant with the oil-soluble, heat-advancing resin to enhance the heat resistant properties of the resin.

However, there has been a need for alternate ways to impart heat strength to neoprene adhesives in order to avoid or minimize the relatively high cost of some of these modifying resins. It has been found that the addition of a zinc halide to a neoprene adhesive allows the reduction or elimination of the oil-soluble, heat-advancing phenol-formaldehyde resins while maintaining or even improving heat-resistant properties of the final adhesive film. It has been found, however, that neoprene adhesives, to which have been added zinc halides, are unstable. Such adhesives gel, often a few days after manufacture, and are thus rendered useless. Apparently gelation is caused by some degree of cross linking or cure of the neoprene by the zinc halide through some mechanism which is not understood. Thus there is a need for means to prevent the gelation of neoprene adhesives to which has been added the zinc halides.

It is a primary object of the present invention to present such a means. It is another object of the present invention to present a neoprene adhesive of the solvent type which contains a zinc halide and which, nevertheless, will not gel after extended storage. It is another object of the present invention to present a solvent-type neoprene adhesive with high heat resistance and yet which minimizes the need for modifying resins while still retaining stablility on storage.

These objects are achieved in a surprisingly effective and straightforward manner. The invention contemplates a neoprene adhesive composition comprising neoprene dissolved in a solvent therefor. The adhesive also contains a zinc halide in an amount of 1–20 parts by weight per 100 parts by weight of the neoprene. Finally, the adhesive must contain water in an amount of 5–20 parts by weight per 100 parts by weight neoprene.

The zinc halide will be zinc chloride or zinc bromide, and preferably zinc chloride. The amount of the zinc halide to be used will vary in the range of 1–20, preferably 5–8, parts by weight of the zinc halide per 100 parts by weight of the neoprene rubber used. Amounts of the zinc halide less than the stated minimum do not improve the properties of the adhesive film sufficiently, while amounts greater than the stated maximum tend to produce a solvent adhesive which will gel too soon despite all efforts to prevent gelation. Additionally, large crystals of the zinc halide will form in the adhesive mass.

The water must be present in an amount of 5–20 parts by weight water per 100 parts by weight of the neoprene. Amounts less than the stated minimum of water will insufficiently stabilize the adhesive, while amounts greater than the stated maximum of water can lead, in the presence of the zinc halide, to appreciable corrosion of the metallic container. Additionally, amounts of water above the stated maximum will separate as a bottom layer in the adhesive, or in the event that fillers are used in the adhesive, will be distributed throughout the body of the adhesive as water globules bound to the filler particles. Preferably, the lowest operable amount, 5–7 parts, will be used.

Although the adhesive of the present invention may consist of nothing more than the neoprene, the solvent, the zinc halide, and the water, the usual fillers, modifying resins, stabilizers, and other additives may be used if desired. The present invention will benefit these adhesives by allowing a great reduction particularly in the amounts of fortifying resins that would normally be used in the solvent-type neoprene adhesives.

The solvent or solvent system to be used in the present invention will be those solvents known to dissolve neoprene and normally used to make neoprene adhesive. Toluene is widely used either alone or in conjunction with a ketone such as methyl ethyl ketone, methyl isobutyl ketone, or with any of the grades of highly aromatic cuts used to dissolve neoprene. Aliphatic hydrocarbon solvents may be added to the solvent system as an aid in adjusting the rate of solvent evaporation when the adhesive film has been spread and is ready to be used. The rubber concentration in the solution of rubber will be in the range of 10%–40% by weight rubber, and more preferbly 20%–30% by weight rubber.

In the past, the oil-soluble, heat-advancing phenol-aldehyde resins described in U.S. Patent No. 2,058,797—Honel have been the resins of choice. Relatively large quantities of 50–150 parts by weight of this resin per 100 parts by weight of the neoprene have been used, with an average amount being in the range of about 60–90 parts by weight of the resin per 100 parts by weight of the neoprene. With the adhesive composition of the present invention, utilizing the zinc halide, substantially reduced amounts of the resin in the range of 30–45 parts may be used with properties which are equal to or superior than those formerly achieved with 80 parts by weight of the resin. Maximum heat resistant properties may be obtained by using 30–45 parts by weight of this resin per 100 parts by weight of the neoprene along with the zinc halide and the water as described earlier.

In making the adhesive composition of the present invention, it is preferred that the water be added to the solvent system prior to the time the neoprene is dissolved in that system. Beneficial effects according to the invention are obtained if the water is added as the last ingredient to the adhesive formulation, although for some unknown reason the benefits are not as pronounced as they are when the water is added earlier in the adhesive-making process.

Where a magnesium oxide is to be reacted with the oil-soluble, heat-advancing resin, reduced amounts of water will be physically added to the adhesive of the present invention. This is true because the reaction between magnesium oxide and the oil-soluble, heat-advancing phenol-aldehyde resin produces water in the amount of approximately 2 moles of water per mole of magnesium oxide reacted with the resin. Certain of the adhesive compositions of the present invention therefore will utilize reduced amounts of water physically added to the mixture since this reduced amount of water will serve to catalyze and speed the reaction between the magnesium oxide and the oil-soluble, heat-advancing phenol-aldehyde resin which will in turn produce the balance of the water needed to form the composition of the present invention.

The following examples illustrative several embodiments of the invention. All parts are by weight unless otherwise stated.

Example 1

A series of neoprene solvent compositions were made up containing varying amounts of water. Each composition was maintained for 30 days at 115° F. to determine whether or not the adhesive composition gelled. In the following runs, compositions A to G, inclusive, formed a tight gel in 10 days. Composition H formed a loose gel. Compositions identified as I, J, K did not gel.

|  | A | B | C | D | E | F | G | H | I | J | K |
|---|---|---|---|---|---|---|---|---|---|---|---|
| Neoprene AC | 100 | 100 | 100 | 100 | 100 | 100 | 100 | 100 | 100 | 100 | 100 |
| $ZnCl_2$ | 10 | 10 | 10 | 10 | 10 | 10 | 10 | 10 | 10 | 10 | 10 |
| CP Acetone | 100 | 100 | 100 | 100 | 100 | 100 | 100 | 100 | 100 | 100 | 100 |
| Toluol | 100 | 100 | 100 | 100 | 100 | 100 | 100 | 100 | 100 | 100 | 100 |
| Hexane | 300 | 300 | 300 | 300 | 300 | 300 | 300 | 300 | 300 | 300 | 300 |
| Water | 0 | ¼ | ½ | 1 | 2 | 3 | 4 | 5 | 7 | 9 | 11 |

Example 2

Two neoprene adhesive compositions containing a resin reactable with magnesium oxide were prepared with differing amounts of water. Composition A gelled in 10 days at 115° F. while composition B was stable.

|  | A | B |
|---|---|---|
| Neoprene AC | 100 | 100 |
| $ZnCl_2$ | 10 | 10 |
| Oil-soluble, heat-advancing, phenol-formaldehyde resin (CKR 1734) | 45 | 45 |
| MgO | 3 | 3 |
| Water | 1 | 3 |
| CP Acetone | 100 | 100 |
| Toluol | 100 | 100 |
| Hexane | 300 | 300 |

Example 3

Four adhesive compositions were made up with different kinds of fortifying resin, differing amounts of magnesium oxide, and differing amounts of water. The effect of water of reaction in the adhesive composition as a stabilizing agent was thus determined. The CKR 1734 resin is an oil-soluble, heat-advancing resin which reacts with MgO to produce water. The CKM 5254 is a non-heat reactive resin which does not combine with magnesium oxide and thus produces no water. Under the test conditions of maintaining the adhesive compositions at 115° F. for 10 days, compositions A and E, below, were stable, compositions B, C, and D were not stable.

|  | A | B | C | D | E |
|---|---|---|---|---|---|
| Neoprene AC | 100 | 100 | 100 | 100 | 100 |
| CKR 1734 | 45 |  | 45 | 45 | 45 |
| CKM 5254 |  | 45 |  |  |  |
| MgO | 3 | 3 | 0 | 3 | 3 |
| $ZnCl_2$ | 10 | 10 | 10 | 10 | 10 |
| $ZnBr_2$ |  |  |  |  | 5 |
| Water | 3 | 3 | 3 | 0 | 3 |
| CP Acetone | 100 | 100 | 100 | 100 | 100 |
| Toluol | 100 | 100 | 100 | 100 | 100 |
| Hexane | 300 | 300 | 300 | 300 | 300 |

I claim:

1. A non-gelling polychloroprene adhesive composition comprising polychloroprene dissolved in a volatile solvent therefor, a zinc halide selected from the group consisting of zinc chloride and zinc bromide in an amount of 1–20 parts by weight per 100 parts by weight polychloroprene, and water in an amount of 5–20 parts by weight per 100 parts by weight polychloroprene.

2. A composition according to claim 1 wherein said zinc halide comprises zinc chloride.

3. A composition according to claim 1 wherein said zinc halide is used in an amount in the range of about 5–8 parts by weight per 100 parts by weight of polychloroprene.

4. A composition according to claim 1 wherein said water is used in an amount of about 5–7 parts by weight per 100 parts by weight polychloroprene.

5. A composition according to claim 1 wherein said volatile solvent comprises a mixture of toluene and a ketone.

6. The method of making a non-gelling polychloroprene adhesive composition comprising, in indifferent order, dissolving polychloroprene in a volatile solvent therefor, adding a zinc halide selected from the group consisting of zinc chloride and zinc bromide in an amount of 1–20 parts by weight per 100 parts by weight of polychloroprene, and adding water in an amount of 5–20 parts by weight per 100 parts by weight polychloroprene.

7. A method according to claim 6 wherein said zinc halide comprises zinc chloride.

8. A method according to claim 6 wherein said water is added to said solvent prior to dissolving the polychloroprene in said solvent.

References Cited by the Examiner

UNITED STATES PATENTS 1,967,863  7/1934  Collins et al. _____ 260—29.7
2,918,442  12/1959  Gerrard et al. _____ 260—33.6

MURRAY TILLMAN, *Primary Examiner.*

J. ZIEGLER, *Assistant Examiner.*